United States Patent
Wu

(10) Patent No.: US 8,649,363 B2
(45) Date of Patent: Feb. 11, 2014

(54) METHOD OF HYBRID AUTOMATIC REPEAT REQUEST ENTITY HANDLING AND COMMUNICATION DEVICE THEREOF

(75) Inventor: Chih-Hsiang Wu, Taoyuan County (TW)

(73) Assignee: HTC Corporation, Taoyuan, Taoyuan County (TW)

(*) Notice: Subject to any disclaimer, the term of this patent is extended or adjusted under 35 U.S.C. 154(b) by 160 days.

(21) Appl. No.: 13/116,025

(22) Filed: May 26, 2011

(65) Prior Publication Data
US 2011/0292894 A1    Dec. 1, 2011

Related U.S. Application Data

(60) Provisional application No. 61/350,035, filed on Jun. 1, 2010, provisional application No. 61/357,109, filed on Jun. 22, 2010.

(51) Int. Cl.
*H04J 1/00* (2006.01)

(52) U.S. Cl.
USPC .......................................................... 370/343

(58) Field of Classification Search
None
See application file for complete search history.

(56) References Cited

U.S. PATENT DOCUMENTS

| | | | |
|---|---|---|---|
| 2009/0300456 A1* | 12/2009 | Pelletier et al. | 714/749 |
| 2010/0111023 A1 | 5/2010 | Pelletier | |
| 2010/0111067 A1 | 5/2010 | Wu | |
| 2010/0118723 A1* | 5/2010 | Pani et al. | 370/252 |
| 2010/0130219 A1 | 5/2010 | Cave | |
| 2011/0021154 A1* | 1/2011 | Marinier et al. | 455/67.11 |

FOREIGN PATENT DOCUMENTS

| | | |
|---|---|---|
| CN | 101917743 A | 12/2010 |
| WO | 2010054376 A1 | 5/2010 |

OTHER PUBLICATIONS

European patent application No. 11044461.7, European Application filing date: May 31, 2011, European Search Report mailing date: Nov. 25, 2011.
CATT, "The indication of the expiration of TAT", 3GPP TSG—RAN WG2 Meeting #64bis, R2-090348, Jan. 12-16, 2009, Ljubljana, Slovenia, XP050322034, p. 1-3.
Huawei, "Discussion on UE transmit timing in CA", 3GPP TSG-RAN WG4 Meeting #55, R4-101723, May 10-14, 2010, Montreal, Quebec, Canada, XP050426718, p. 1-3.
CATT, "PCC Change", 3GPP TSG RAN WG2 Meeting #69bis, R2-102061, Apr. 12-16, 2010, Beijing, China, XP050422546, p. 1-5.
3GPP TS 36.321 V9.2.0 3rd Generation Partnership Project; Technical Specification Group Radio Access Network; Evolved Universal Terrestrial Radio Access (E-UTRA); Medium Access Control (MAC) protocol specification (Release 9), Mar. 2010.
3GPP TS 36.331 V9.2.0 3rd Generation Partnership Project; Technical Specification Group Radio Access Network; Evolved Universal Terrestrial Radio Access (E-UTRA); Radio Resource Control (RRC); Protocol specification (Release 9), Mar. 2010.
3GPP TSG-RAN WG2 Meeting #70 R2-103427 "Stage 2 description of Carrier Aggregation", May 2010.

(Continued)

*Primary Examiner* — Yong Zhou
(74) *Attorney, Agent, or Firm* — Winston Hsu; Scott Margo

(57) ABSTRACT

A method of hybrid automatic repeat request (HARQ) entity handling for a communication device capable of receiving and transmitting on a plurality of component carriers in a wireless communication system is disclosed. The method comprises resetting a HARQ entity associated to a component carrier of the plurality of component carriers when a component carrier configuration associated to the component carrier is changed.

12 Claims, 5 Drawing Sheets

(56) References Cited

OTHER PUBLICATIONS

European patent application No. 11004461.7, European Search Report mailing date: Sep. 1, 2011.
ZTE, "DRX and activation/deactivation", 3GPP TSG RAN WG2#69bis, R2-102177, Apr. 12-16, 2010, Beijing, China, XP050422587, p. 1-4.
CATT, "CC management in CA", 3GPP TSG RAN WG2 meeting #68bis, R2-100061, Jan. 18-22, 2010, Valencia, Spain, XP050420909, p. 1-4.
E-mail rapporteur(NTT Docomo, Inc.), "CA support for multi-TA", 3GPP TSG-RAN2#69, R2-101567, Feb. 22-26, 2010, San Francisco, U.S.A, XP050421923, p. 1-12.
Ericsson, "Impact of Carrier Aggregation on the L2 protocol architecture for LTE Rel-10", 3GPP TSG-RAN WG2 #66, Tdoc R2-092957, May 4-8, 2009, San Francisco, USA, XP050340752, p. 1-8.
Office Action mailed on January 15, 2013 for the Japanese application No. 2011-123690, filing date Jun. 1, 2011, pp. 1-3.
Office Action mailed on Jul. 8, 2013 for the China application No. 201110147038.8, filing date: Jun. 1, 2011, p. 1-7.
Office Action mailed on Dec. 13, 2012 for the Korean application No. 10-2011-0052646, filing date Jun. 1, 2011, pp. 1-2.
Notice of Allowance mailed on Oct. 22, 2013 for the Japanese application No. 2011-123690, filing date Jun. 1, 2011, pp. 1-3.

\* cited by examiner

METHOD OF HYBRID AUTOMATIC REPEAT REQUEST ENTITY HANDLING AND COMMUNICATION DEVICE THEREOF

CROSS REFERENCE TO RELATED APPLICATIONS

This application claims the benefit of U.S. Provisional Application No. 61/350,035, filed on Jun. 1, 2010 and entitled "Method and Apparatus for resetting a HARQ entity in a wireless communication system", and No. 61/357,109, filed on Jun. 22, 2010 and entitled "Method and Apparatus for resetting a HARQ entity in a wireless communication system" the contents of which are incorporated herein in their entirety.

BACKGROUND OF THE INVENTION

1. Field of the Invention

The application relates to a method utilized in a wireless communication system and a communication device thereof, and more particularly, to a method of HARQ entity handling in a wireless communication system and a related communication device.

2. Description of the Prior Art

Long Term Evolution wireless communication system (LTE system), an advanced high-speed wireless communication system established upon the 3G mobile telecommunication system, supports only packet-switched transmission, and tends to implement both Medium Access Control (MAC) layer and Radio Link Control (RLC) layer in one single communication site, such as in Node B (NB) alone rather than in NB and RNC (Radio Network Controller) respectively, so that the system structure becomes simple.

Architecture of the radio interface protocol of a LTE system includes three layers: the Physical Layer (Layer 1), the Data Link Layer (Layer 2), and the Network Layer (Layer 3), where a control plane of Layer 3 is a Radio Resource Control (RRC) layer, and Layer 2 is further divided into a Packet Data Convergence Protocol (PDCP) layer, a Radio Link Control (RLC) layer and a Medium Access Control (MAC) layer.

There is a MAC entity in the MAC layer of a user equipment (UE) for handling transport channels, such as broadcast channel (BCH), downlink shared channel (DL-SCH), paging channel (PCH), uplink shared channel (UL-SCH), random access channel (RACH), and multicast channel (MCH). In addition, if a reset of the MAC entity is requested by upper layers (e.g. the RRC layer), the UE shall stop (if running) all MAC timers, consider the time alignment timer as expired, set the new data indicators (NDIs) for all uplink HARQ processes to a default value (e.g. 0) for a new transmission, stop ongoing random access procedure, cancel triggered scheduling request procedure, cancel triggered buffer status reporting procedure, cancel triggered power headroom reporting procedure, flush soft buffers for all downlink HARQ processes, for each downlink HARQ process, consider the next received transmission for a transport block (TB) as the very first transmission, release temporary cell radio network temporary identifier (C-RNTI).

Toward advanced high-speed wireless communication system, such as transmitting data in a higher peak data rate, LTE-Advanced system is standardized by the 3rd Generation Partnership Project (3GPP) as an enhancement of LTE system. LTE-Advanced system targets faster switching between power states, improves performance at the cell edge, and includes subjects, such as bandwidth extension, coordinated multipoint transmission/reception (COMP), uplink multiple input multiple output (MIMO), etc.

For bandwidth extension, carrier aggregation is introduced to the LTE-Advanced system for extension to wider bandwidth, where two or more component carriers are aggregated, for supporting wider transmission bandwidths (for example up to 100 MHz) and for spectrum aggregation. According to carrier aggregation capability, multiple component carriers are aggregated into overall wider bandwidth, where the UE can establish multiple links corresponding to the multiple component carriers for simultaneously receiving and transmitting. In carrier aggregation, the UE only has one RRC connection with the network. At RRC connection establishment/re-establishment/handover, one serving cell provides the NAS mobility information, and at RRC connection re-establishment/handover, one serving cell provides the security input. This cell is referred to as a Primary Cell (PCell). In the downlink, the component carrier corresponding to the PCell is the Downlink Primary Component Carrier (DL PCC) while in the uplink it is the Uplink Primary Component Carrier (UL PCC). In addition, for both uplink and downlink, each component carrier includes a HARQ entity, which maintains a number of parallel HARQ processes allowing transmissions to take place continuously while waiting for the feedback (acknowledgement (ACK) or non-acknowledgement (NACK)) on the successful or unsuccessful reception of previous transmissions.

For a UE supporting a single component carrier in the LTE system, a NDI of a HARQ entity is set to a default value when the MAC entity is reset. For a UE supporting multiple component carriers in the LTE-Advanced system, there is no clear specification for HARQ entity reset. More specifically, how to set a new data indicator for an uplink HARQ process of the HARQ entity is not defined. When a component carrier configuration of the UE is changed (e.g. a component carrier is reconfigured, added, or removed by RRC layer, or is activated or deactivated by MAC layer), the UE may reset all HARQ entities in multiple component carriers based on the MAC entity reset mechanism. This makes data transmission failed. For example, since only the component carrier is reconfigured, added, removed, activated, or deactivated, the UE sets new data indicators for all HARQ processes in all HARQ entities to a default value (e.g. 0) for a new transmission. Thus, new data indicators for other component carriers may be set differently between the UE and an eNB. Therefore, the UE transmits a retransmission but actually the eNB schedules as a new transmission, causing data transmission failure.

SUMMARY OF THE INVENTION

The application discloses a method of HARQ entity handling in a wireless communication system and a related communication device in order to solve the abovementioned problem.

A method of HARQ entity handling for a communication device capable of receiving and transmitting on a plurality of component carriers in a wireless communication system is disclosed. The method comprises resetting a HARQ entity associated to a component carrier of the plurality of component carriers when a component carrier configuration associated to the component carrier is changed.

A method of HARQ entity handling for a communication device capable of receiving and transmitting on a plurality of component carriers in a wireless communication system is disclosed. The method comprises maintaining context of a HARQ entity associated to a component carrier of the plurality of component carriers when a component carrier configuration associated to the component carrier is changed.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
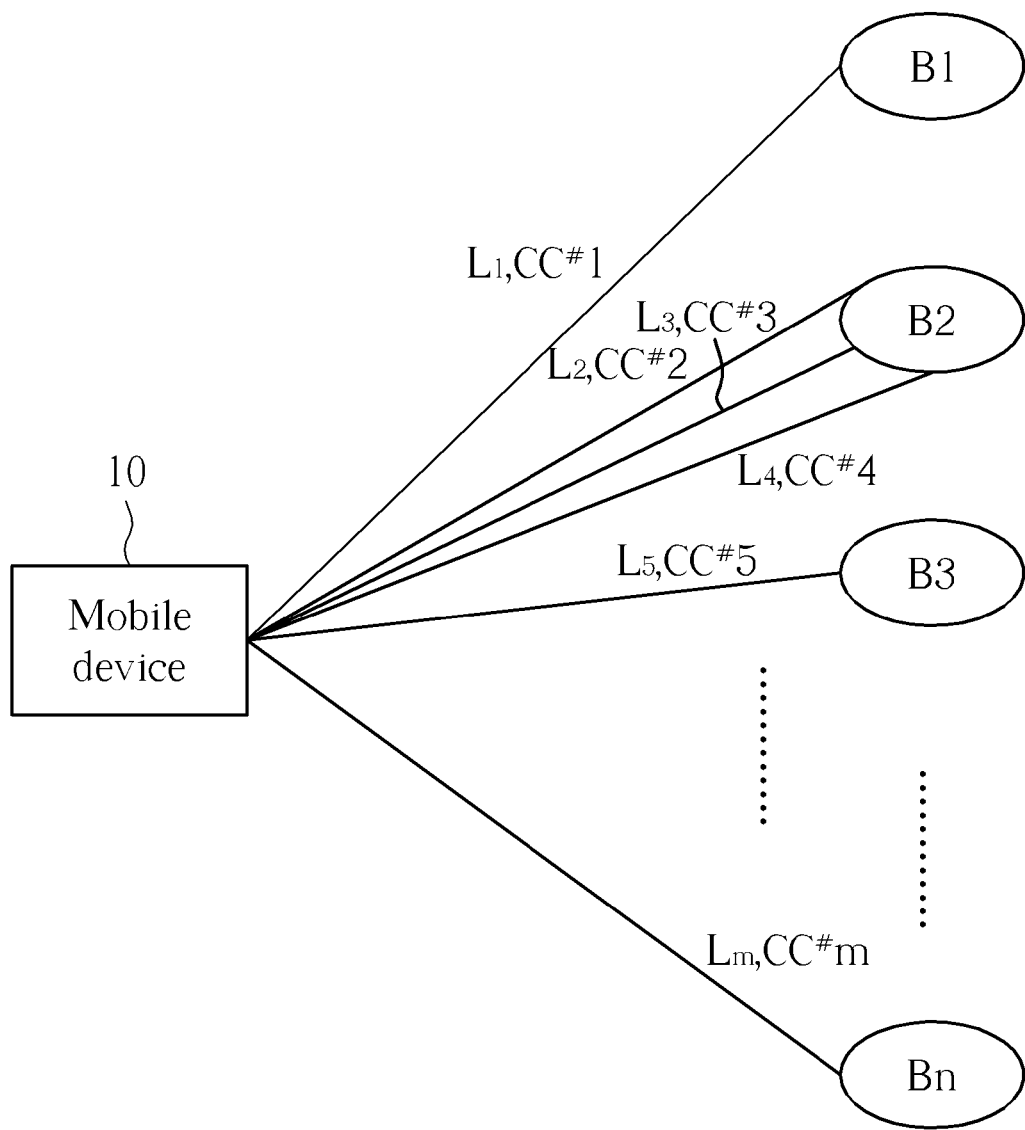
FIG. 1 illustrates a schematic diagram of an exemplary wireless communication system.

Please refer to FIG. 1, which illustrates a schematic diagram of a wireless communication system featuring multiple connections between a mobile device 10 and base stations B1-Bn. The wireless communication system may be a LTE-Advanced system (i.e. an evolved universal terrestrial radio access network (E-UTRAN)) or any other similar network system. The mobile device 10 can operate with carrier aggregation. In FIG. 1, the mobile device 10 communicates with the base stations B1-Bn through radio links $L_1$-$L_m$ that correspond to component carriers cc#1-cc#m configured in the mobile device 10 respectively. Each of the component carriers cc#1-cc#m corresponds to a radio frequency (RF) channel whose bandwidth may be varied according to different communication systems. In addition, the mobile device 10 is referred as a user equipment (UE) or a mobile station (MS), and can be a device such as a mobile phone, a computer system, etc.

Figure 2:
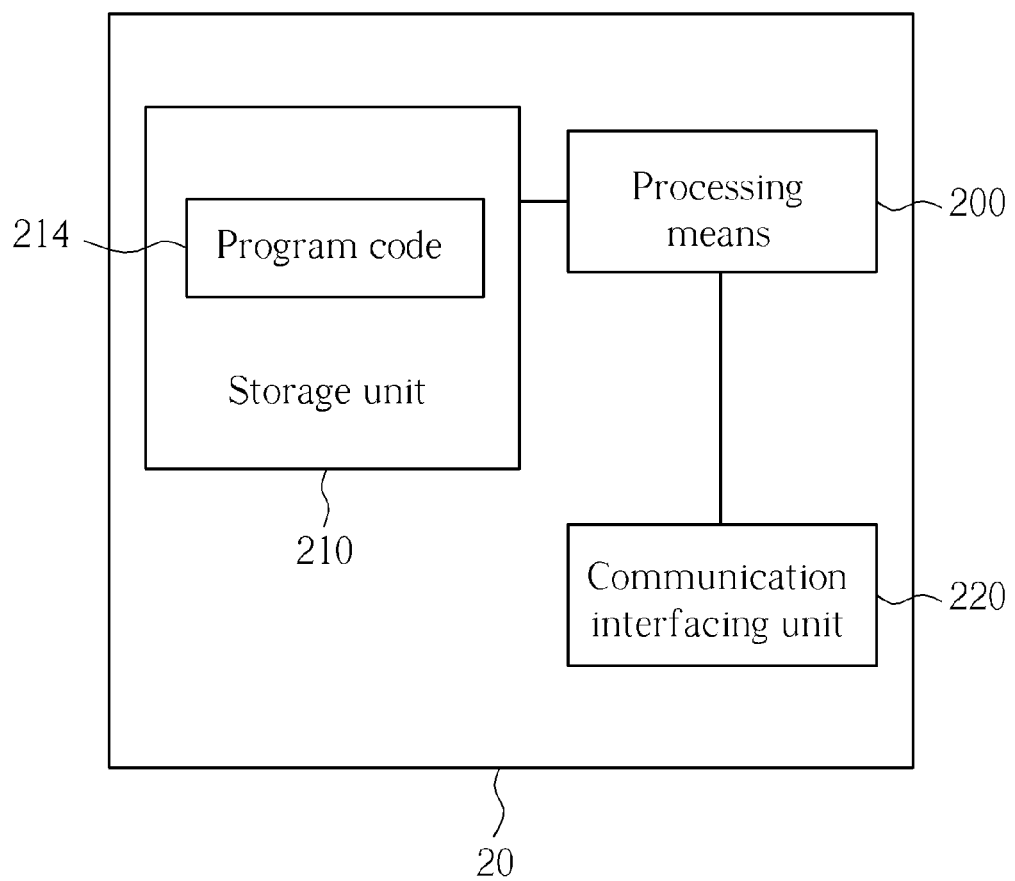
FIG. 2 illustrates a schematic diagram of an exemplary communication device.

FIG. 2 illustrates a schematic diagram of an exemplary communication device 20. The communication device 20 can be the mobile device 10 shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that can store program code 214, for access by the processing means 200. Examples of the storage unit 210 include but are not limited to a subscriber identity module (SIM), read-only memory (ROM), flash memory, random-access memory (RAM), CD-ROMs, magnetic tape, hard disk, and optical data storage device. The communication interfacing unit 220 is preferably a radio transceiver and can exchange wireless signals with the network according to processing results of the processing means 200.

Figure 3:
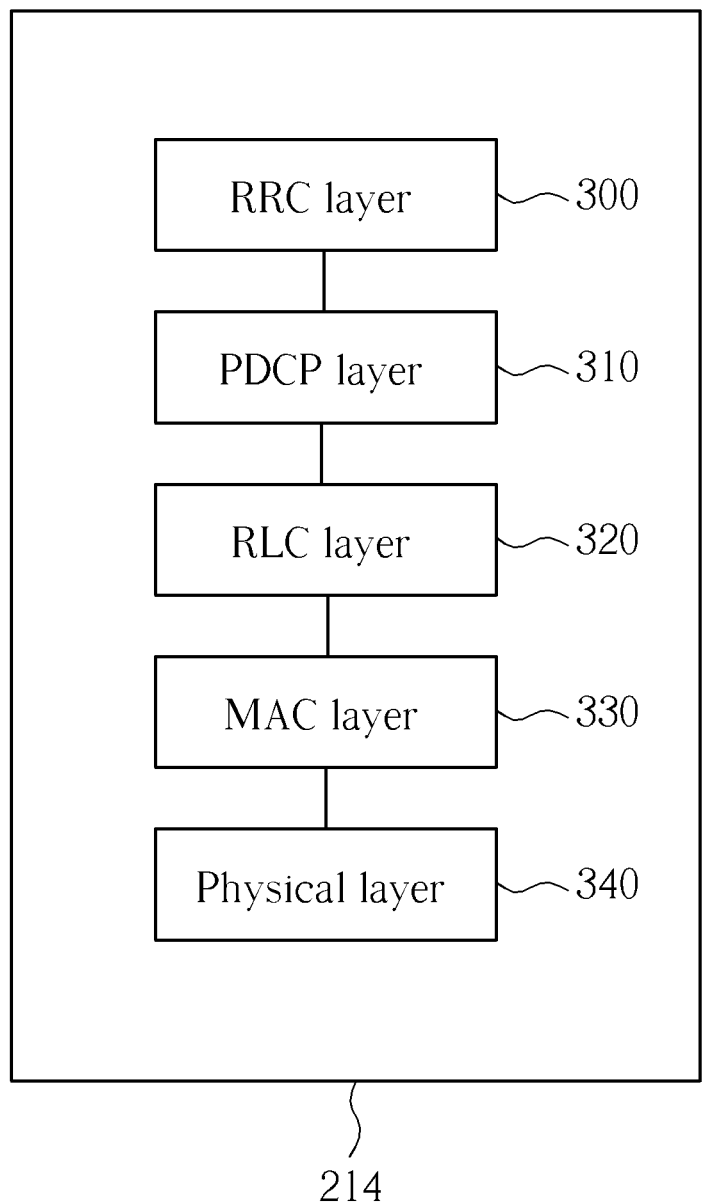
FIG. 3 illustrates a schematic diagram of communication protocol layers for an exemplary communication system.

Please refer to FIG. 3, which illustrates a schematic diagram of communication protocol layers for the LTE system. The behaviors of some of the protocol layers may be defined in the program code 214 and executed by the processing means 200. The protocol layers from top to bottom are a radio resource control (RRC) layer 300, a packet data convergence protocol (PDCP) layer 310, a radio link control (RLC) layer 320, a medium access control (MAC) layer 330 and a physical (PHY) layer 340. Main services and functions of the MAC layer 330 include error correction through HARQ, uplink synchronization through a random access procedure, buffer status reporting, power headroom reporting, etc. The buffer status reporting procedure is used to provide the network (e.g. an eNB) with information about the amount of data in uplink buffers of a UE for scheduling of uplink transmission. The power headroom reporting procedure is used to provide the eNB with information about the difference between the UE TX (Transmission) power and the maximum UE TX power. Furthermore, a scheduling request can be made by the MAC layer 330 to request the network for uplink resources.

Figure 4:
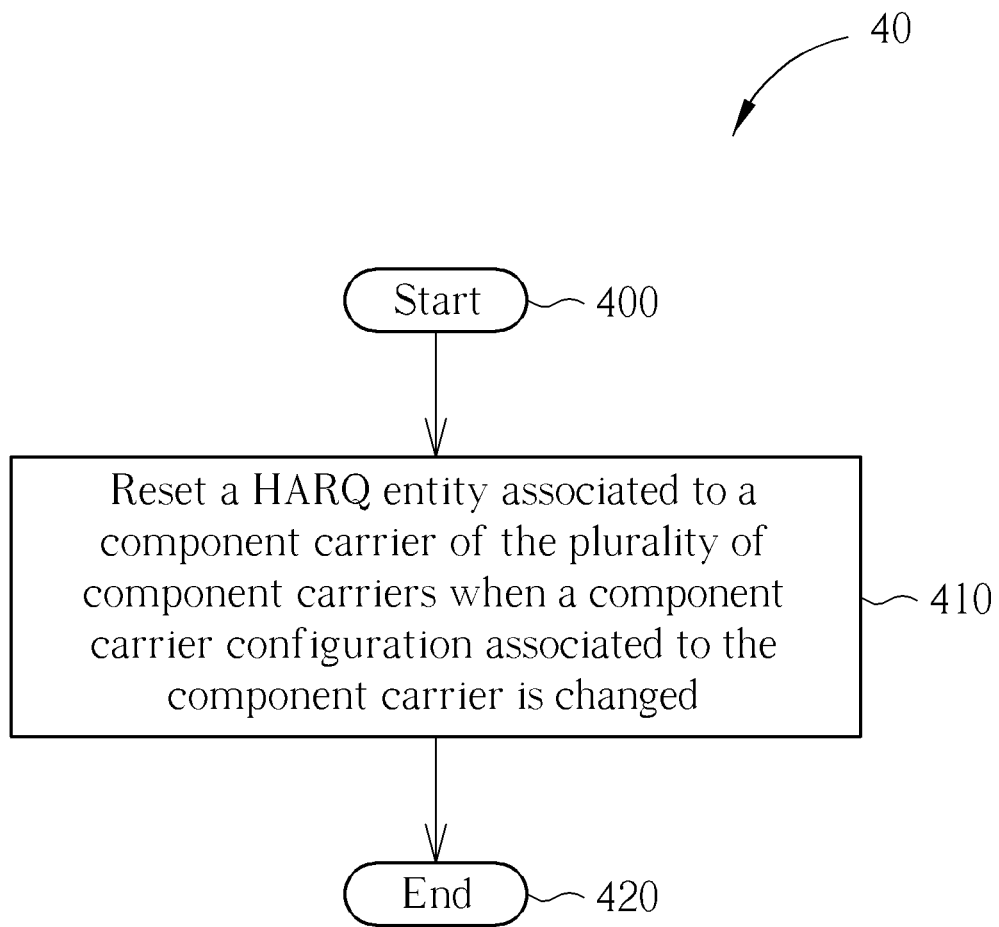
FIG. 4 is a flowchart of an exemplary process.

Please refer to FIG. 4, which illustrates a flowchart of an exemplary process 40. The process 40 is utilized in a UE (as the mobile device 10 of FIG. 1) capable of communicating with the network through a plurality of component carriers, for HARQ entity reset. The process 40 can be compiled into the program code 214 and includes the following steps:

Step 400: Start.

Step 410: Reset a HARQ entity associated to a component carrier of the plurality of component carriers when a component carrier configuration associated to the component carrier is changed.

Step 420: End.

According to the process 40, the UE resets the HARQ entity only associated to the component carrier when the component carrier is reconfigured, added, removed, activated, or deactivated. The component carrier may be reconfigured (e.g. parameters of the component carrier configuration changes), added or removed by the RRC layer 300 with a RRC procedure without involving handover (e.g. RRCConnectionReconfiguration not including the mobilityControlInfo), or may be activated or deactivated by the MAC layer 330 with a MAC control element, and thereby the UE resets a HARQ entity only associated to the reconfigured, added, removed, activated, or deactivated component carrier.

Take an example based on the process 40. Referring back to FIG. 1, the UE is configured with component carriers cc#1-cc#m. When any of the component carriers cc#1-cc#m is reconfigured, added, removed, activated, or deactivated (e.g. the component carrier cc#2), the UE or the eNB resets a HARQ entity associated to the component carrier cc#2 only. More specifically, the UE or the eNB considers a next transmission for each HARQ process corresponding to the HARQ entity as a new transmission after resetting the HARQ entity, e.g. by flushing buffers for HARQ transmission or reception, or setting the new data indicators (NDIs) for all HARQ processes corresponding to the HARQ entity to a default value (e.g. 0) for a new transmission. The buffers are HARQ buffers for HARQ processes used for transmitting transport blocks and soft buffers for HARQ processes used for receiving transport blocks. For example, if the component carrier cc#2 is an uplink component carrier, the buffers are HARQ buffers for all uplink HARQ processes corresponding to the HARQ entity in the UE and soft buffers for all uplink HARQ processes corresponding to the HARQ entity in the eNB. If the component carrier cc#2 is a downlink component carrier, the buffers are soft buffers for all downlink HARQ processes corresponding to the HARQ entity in the UE and HARQ buffers for all downlink HARQ processes corresponding to the HARQ entity in the eNB. Thus, the UE or the eNB considers the next transmitted/received transmission for a transport block as a new transmission for each HARQ process corresponding to the HARQ entity in the UE or the eNB.

Note that, the NDI value is used for determining whether a data transmission is a new transmission or retransmission of a transport block. In addition, the UE or the eNB replaces the data currently in the soft buffer for the transport block with received data if it is a new transmission, whereas combines the received data with the data currently in the soft buffer if it is a retransmission. These shall be well known in the art, so the detail is omitted herein.

Besides, the UE or the eNB stops MAC timer(s) associated to the component carrier (e.g. the component carrier cc#2). The MAC timer may be a HARQ RTT Timer, which provides minimum amount of subframe(s) before a downlink HARQ retransmission is expected by the UE, or a time alignment timer, which is used to control how long the UE is considered uplink time aligned. The MAC timer may be sCellDeactivationTimer timer which is used to control how long the UE considers a secondary cell (SCell) is activated. In addition, the UE or the eNB sets MAC counter(s) (e.g. CURRENT_TX_NB for each HARQ process) associated to the component carrier cc#2 to default value(s) (e.g. 0). Each HARQ process shall maintain a state variable CURRENT_TX_NB, which indicates the number of transmissions that have taken place for the MAC PDU currently in the buffer of the UE.

On the other hand, the UE shall keep time alignment timer running, ongoing random access procedure, triggered scheduling request procedure, triggered buffer status reporting procedure, triggered power headroom reporting procedure, or temporary cell radio network temporary identifier (C-RNTI) when the HARQ entity in the component carrier cc#2 is reset. More specifically, the UE considers the time alignment timer as not expired if the time alignment timer for the component carrier cc#2 is also utilized for other component carriers (e.g. the component carrier cc#1). Otherwise, the UE shall consider the time alignment timer as expired if the time alignment timer is utilized for the component carrier cc#2 only. In addition, the UE maintains the ongoing random access procedure/triggered scheduling request procedure/triggered power headroom reporting procedure if the ongoing random access procedure/triggered scheduling request procedure/triggered power headroom reporting procedure is not performed in the component carrier cc#2. Otherwise, the UE stops or cancels the ongoing random access procedure/triggered scheduling request procedure/triggered power headroom reporting procedure if the ongoing random access procedure/triggered scheduling request procedure/triggered power headroom reporting procedure is performed in the component carrier cc#2.

Based on the process 40, the UE or the eNB knows how to reset HARQ entities in multiple component carrier system (e.g. the LTE-Advanced system). The UE or the eNB resets a HARQ entity only in an activated, deactivated, added, removed, or reconfigured component carrier.

Figure 5:
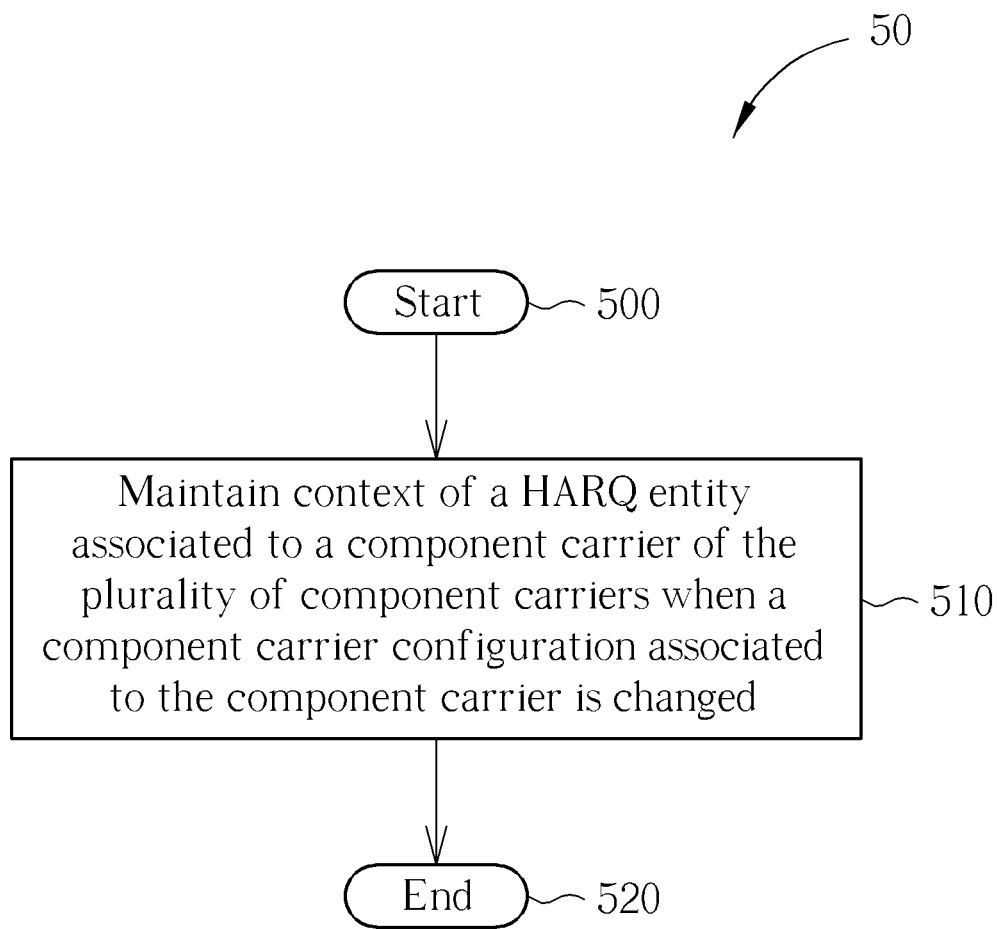
FIG. 5 is a flowchart of an exemplary process.

Please refer to FIG. 5, which illustrates a flowchart of an exemplary process 50. The process 50 is utilized in a UE (as the mobile device 10 of FIG. 1) capable of communicating with the network through a plurality of component carriers, for HARQ entity reset. The process 50 can be compiled into the program code 214 and includes the following steps:

Step 500: Start.

Step 510: Maintain context of a HARQ entity associated to a component carrier of the plurality of component carriers when a component carrier configuration associated to the component carrier is changed.

Step 520: End.

According to the process 50, the UE maintains the context of the HARQ entity associated to the component carrier when the component carrier is reconfigured, added or removed by the RRC layer 300 with a RRC procedure, or is activated or deactivated by the MAC layer 300 with MAC control element. In other words, the UE does not change the context of the HARQ entity in the component carrier, so as to avoid that the context of the HARQ entity is set differently between the UE and the network (i.e. an eNB). The context of the HARQ entity includes stored NDI value and data in HARQ buffer or soft buffer for each HARQ process in the HARQ entity.

Take an example based on the process 50. Referring back to FIG. 1, the UE is configured with component carriers cc#1-cc#m. When any of the component carriers cc#1-cc#m is reconfigured, added, removed, activated, or deactivated (e.g. the component carrier cc#2), the UE or the eNB keeps context of a HARQ entity of the component carrier cc#2. More specifically, the UE or the eNB keeps the ND's for all HARQ processes corresponding to the HARQ entity, and/or keeps the buffers for all HARQ processes corresponding to the HARQ entity.

Besides, the UE or the eNB keeps MAC timer(s) associated to the component carrier cc#2. The MAC timer may be a HARQ RTT Timer, a time alignment timer, or a sCellDeactivationTimer timer. In addition, the UE or the eNB keeps MAC counter(s) (e.g. CURRENT_TX_NB for each HARQ process) associated to the component carrier cc#2 to default value(s) (e.g. 0). On the other hand, the UE shall keep ongoing random access procedure, triggered scheduling request procedure, triggered buffer status reporting procedure, triggered power headroom reporting procedure, or temporary C-RNTI when the HARQ entity of the component carrier cc#2 is reset. More specifically, the UE maintains time alignment timer running, ongoing random access procedure, triggered scheduling request procedure, triggered buffer status reporting procedure, triggered power headroom reporting procedure, or temporary C-RNTI based on whether the time alignment timer, ongoing random access procedure, triggered scheduling request procedure, triggered buffer status reporting procedure, triggered power headroom reporting procedure, or temporary C-RNTI is associated to the component carrier cc#2 only. The detailed description can be referred from above, so it is not given herein.

Based on the process 50, how to reset HARQ entities in multiple component carrier system is clearly defined. The UE or the eNB maintains context of a HARQ entity in an activated, deactivated, added, removed, or reconfigured component carrier.

In conclusion, the present invention provides methods and apparatus for handling HARQ entity reset, so as to efficiently and correctly reset a HARQ entity of a component carrier in multiple component carrier system.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of hybrid automatic repeat request (HARQ) entity handling for a communication device capable of receiving and transmitting on a plurality of component carriers in a wireless communication system, the method comprising:

resetting a HARQ entity associated to a component carrier of the plurality of component carriers when a component carrier configuration associated to the component carrier is changed; and maintaining at least one of a time alignment timer running, ongoing random access procedure, triggered scheduling request procedure, triggered buffer status reporting procedure, triggered power headroom reporting procedure, and temporary cell radio network temporary identifier (C-RNTI), comprising at least one of:

determining the time alignment timer, which is used to control how long the communication device is considered uplink time aligned, as not expired when the time alignment timer is utilized not only for the component carrier;

maintaining the ongoing random access procedure when the ongoing random access procedure is not performed in the component carriers; and maintaining the triggered scheduling request procedure when the triggered scheduling request procedure is not performed in the component carrier.

2. The method of claim 1, wherein resetting the HARQ entity associated to the component carrier of the plurality of component carriers when the component carrier configuration associated to the component carrier is changed comprises:

resetting the HARQ entity associated to the component carrier when the component carrier is reconfigured, added, removed, activated, or deactivated.

3. The method of claim 1, wherein resetting the HARQ entity associated to the component carrier of the plurality of component carriers when the component carrier configuration associated to the component carrier is changed comprises:

determining a next transmission for each HARQ process corresponding to the HARQ entity as a new transmission.

4. The method of claim 1, wherein resetting the HARQ entity associated to the component carrier of the plurality of component carriers when the component carrier configuration associated to the component carrier is changed comprises:

flushing buffers for all HARQ processes corresponding to the HARQ entity when the component carrier configuration associated to the component carrier is changed.

5. The method of claim 1, wherein resetting the HARQ entity associated to the component carrier of the plurality of component carriers when the component carrier configuration associated to the component carrier is changed comprises:

stopping a medium access control (MAC) timer utilized for the component carrier when the component carrier configuration associated to the component carrier is changed; or setting a MAC counter value associated to the component carrier to a default value when the component carrier configuration associated to the component carrier is changed.

6. The method of claim 1, wherein maintaining at least one of the time alignment timer running, ongoing random access procedure, triggered scheduling request procedure, triggered buffer status reporting procedure, triggered power headroom reporting procedure, and temporary C-RNTI further comprises at least one of:

determining the time alignment timer as expired when the time alignment timer is utilized only for the component carrier;

stopping the ongoing random access procedure when the ongoing random access procedure is performed in the component carrier; and canceling the triggered scheduling request procedure when the triggered scheduling request procedure is performed in the component carrier.

7. A method of hybrid automatic repeat request (HARQ) entity handling for a communication device capable of receiving and transmitting on a plurality of component carriers in a wireless communication system, the method comprising:

maintaining context of a HARQ entity associated to a component carrier of the plurality of component carriers when a component carrier configuration associated to the component carrier is changed; and maintaining at least one of a time alignment timer running, ongoing random access procedure, triggered scheduling request procedure, triggered buffer status reporting procedure, triggered power headroom reporting procedure, and temporary cell radio network temporary identifier (C-RNTI), comprising at least one of:

determining the time alignment timer, which is used to control how long the communication device is considered uplink time aligned, as not expired when the time alignment timer is utilized not only for the component carrier;

maintaining the ongoing random access procedure when the ongoing random access procedure is not performed in the component carriers; and maintaining the triggered scheduling request procedure when the triggered scheduling request procedure is not performed in the component carrier.

8. The method of claim 7, wherein maintaining the context of the HARQ entity associated to the component carrier of the plurality of component carriers when the component carrier configuration associated to the component carrier is changed comprises:

maintaining the context of the HARQ entity associated to the component carrier when the component carrier is reconfigured, added, removed, activated, or deactivated.

9. The method of claim 7, wherein maintaining the context of the HARQ entity associated to the component carrier of the plurality of component carriers when the component carrier configuration associated to the component carrier is changed comprises:

maintaining stored new data indicators for all HARQ processes corresponding to the HARQ entity when the component carrier configuration associated to the component carrier is changed.

10. The method of claim 7, wherein maintaining the context of the HARQ entity associated to the component carrier of the plurality of component carriers when the component carrier configuration associated to the component carrier is changed comprises:

maintaining buffers for all HARQ processes corresponding to the HARQ entity when the component carrier configuration associated to the component carrier is changed.

11. The method of claim 7, wherein maintaining the context of the HARQ entity associated to the component carrier of the plurality of component carriers when the component carrier configuration associated to the component carrier is changed comprises:

maintaining a medium access control (MAC) timer utilized for the component carrier running when the component carrier configuration associated to the component carrier is changed; or maintaining a MAC counter value associated to the component carrier when the component carrier configuration associated to the component carrier is changed.

12. The method of claim 7, wherein maintaining at least one of the time alignment timer running, ongoing random access procedure, triggered scheduling request procedure, triggered buffer status reporting procedure, triggered power headroom reporting procedure, and temporary C-RNTI further comprises at least one of:

determining the time alignment timer as expired when the time alignment timer is utilized only for the component carrier;
stopping the ongoing random access procedure when the ongoing random access procedure is performed in the component carrier; and
canceling the triggered scheduling request procedure when the triggered scheduling request procedure is performed in the component carrier.

\* \* \* \* \*